United States Patent [19]

Gilgen

[11] Patent Number: 4,723,103

[45] Date of Patent: Feb. 2, 1988

[54] CONTROL EQUIPMENT FOR AN ELECTRO-MAGNETIC LINEAR MOTOR

[75] Inventor: Jakob Gilgen, Schwarzenburg, Switzerland

[73] Assignee: Gilgen AG, Schwarzenburg, Switzerland

[21] Appl. No.: 848,463

[22] Filed: Apr. 7, 1986

[30] Foreign Application Priority Data

Apr. 11, 1985 [CH] Switzerland ............... 1554/85

[51] Int. Cl.⁴ .................. G05B 11/00; H02P 8/00
[52] U.S. Cl. .................... 318/687; 318/135; 318/696; 310/12; 104/290
[58] Field of Search .......... 318/38, 118, 34, 135, 318/138, 136, 317, 254, 439, 251, 252, 385, 387, 391, 392, 492, 685, 484, 621, 687, 696; 310/12, 13, 14; 104/290–294, 297, 298, 300, 303

[56] References Cited

U.S. PATENT DOCUMENTS

| | | | |
|---|---|---|---|
| 3,863,118 | 1/1975 | Lander et al. | 318/685 |
| 3,904,942 | 9/1975 | Holtz | 318/135 |
| 3,914,670 | 10/1975 | Holtz | 318/135 X |
| 3,974,778 | 8/1976 | Black et al. | 104/292 |
| 4,096,422 | 6/1978 | Fleming et al. | 318/314 |
| 4,238,715 | 12/1980 | Parsch et al. | 318/135 |
| 4,368,411 | 1/1983 | Kidd | 318/341 X |
| 4,381,478 | 4/1983 | Saijo et al. | 318/135 |
| 4,454,460 | 6/1984 | Tahara et al. | 318/439 X |
| 4,456,934 | 6/1984 | Wedman et al. | 310/12 X |
| 4,463,290 | 7/1984 | Asakawa et al. | 318/687 X |
| 4,489,258 | 12/1984 | Kahlen et al. | 318/317 |
| 4,509,001 | 4/1985 | Wakabayashi et al. | 318/687 |
| 4,556,836 | 12/1985 | Antognini | 318/685 X |
| 4,618,808 | 10/1986 | Ish-Shalom et al. | 318/696 |

*Primary Examiner*—William M. Shoop, Jr.
*Assistant Examiner*—Paul Ip
*Attorney, Agent, or Firm*—Stevens, Davis, Miller & Mosher

[57] ABSTRACT

A control apparatus for a linear motor, having main and auxiliary driving coils and which drives a movable plate is disclosed. The control apparatus, which determines if the plate is within an active area of the motor and, if so, supplies current to the coils, includes an alarm circuit for generating a first measuring signal dependent on the current flowing through the main coil and a second measuring signal dependent on the current flowing through the auxiliary coil. The phase relation between the two measuring signals changes depending on whether the plate is within the active area of the linear motor or not. The alarm circuit senses the measuring signals and generates a switch signal at a first output and an engaged signal at a second output if the plate is within the active area of the linear motor. The switch signal is coupled to an adjustable delay circuit which transmits the delayed switch signal to a switching circuit to actuate a switching medium connected in series with the linear motor. The delay circuit has another input for an engaged signal generated by another control apparatus and, if such an engaged signal is present, the transmission of the switch signal to the switching circuit is prevented.

5 Claims, 7 Drawing Figures

CONTROL EQUIPMENT FOR AN ELECTRO-MAGNETIC LINEAR MOTOR

FIELD OF THE INVENTION

The invention refers to a control equipment for an electro-magnetic linear motor and, more particularly.

DISCUSSION OF THE PRIOR ART

Figure 7:
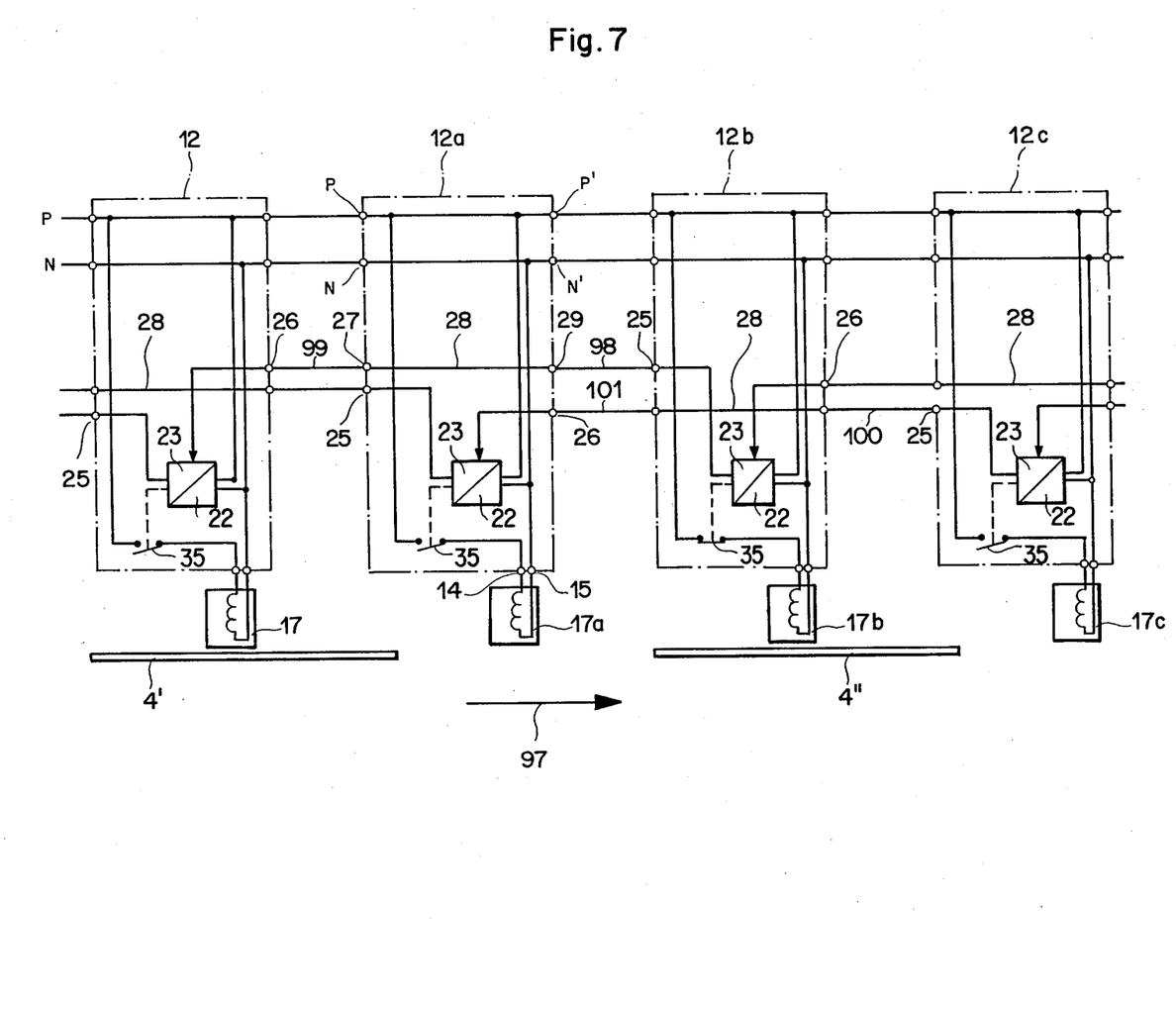
FIG. 7 shows the series connection of several control equipments according to FIG. 2.

It is a known fact that electro-magnetic linear motors are used for driving vehicles which are running on rails. Basically, the linear motor functions in the same way as a threephase current squirrel cage induction motor where a rotating field drives the armature. If a three-phase current motor is cut open in the axial direction and spread out on a plane, the result is a flat rotor and what is called a plane inductor fitted with coils which generates a linear travelling wave. Such induction combs are arranged adjacent to and alongside of the rails and at a certain distance with respect to the rails. A plate functioning as a flat armature is mounted on each trolley so that the plate moves past the induction combs with the shortest possible distance. By energizing the induction combs, a linear thrust is transmitted without contact with the trolley. This thrust is strongest when the trolley is stationary, and diminishes in a reciprocally proportional way to the trolley speed. FIG. 7 is a very simplified and schematic illustration of two such trolleys 1. Trolley 1 is equipped with running wheels 2 running on rails 3. On each one of these trolleys 1, a plate 4 functioning as a flat armature is fastened which extends in parallel to rail 3. Above the rail 3 the stationary induction combs 5 are arranged at a defined distance. The coils of the induction combs 5 and their connecting transmissions are not represented in FIG. 1. Since a linear motor not only transfers forces in the horizontal direction of motion of the travelling field, but forces of attraction between the induction comb 5 and the plate 2 also exist, two air gap spacing rollers 6 are mounted both in front and behind each induction comb 5 to guarantee a constant air gap between the induction comb 5 and the plate mounted below. Elastic elements 8 are arranged between the frame 7 of each trolley 1 and the associated plate 4 which press the plates slightly onto the air gap spacing rollers 6.

It is also possible to use single-phase induction combs which, for example, have four grooves each where one main coil and one auxiliary coil which are powered via a capacitor are located. These coils generate the travelling field. In order to keep the electric energy consumption as low as possible, it is common practice to energize each induction comb only when and as long as it is used for driving a trolley. Therefore, the energizing of the coils of the induction combs is switched on and off by the trolley without contact by means of a linear motor switch 9 which is mounted on each inductor. In connection with the linear motor switch 9, a sensor 10 which is mounted at the rear end of each induction comb 5 guarantees a gentle stacking of the trolleys, i.e. they smoothly drive against each other. By means of one transmission line 11 each, the sensor 10 of the following induction comb 5 is connected to the linear motor switch 9 of the preceeding induction comb, so that the induction comb 5 can only be energized by the linear motor switch 9 if there is no plate 5, i.e. no trolley 1, below the succeeding induction comb 5.

SUMMARY OF THE INVENTION

It is the purpose of the present invention to design a control equipment of the afore-mentioned kind which eliminates the linear motor switches and sensors mounted on the induction combs.

BRIEF DESCRIPTION OF THE DRAWINGS

The invention will be better understood from the following detailed description which is provided in connection with the accompanying drawings in which.

DETAILED DESCRIPTION OF THE INVENTION

Figure 2:
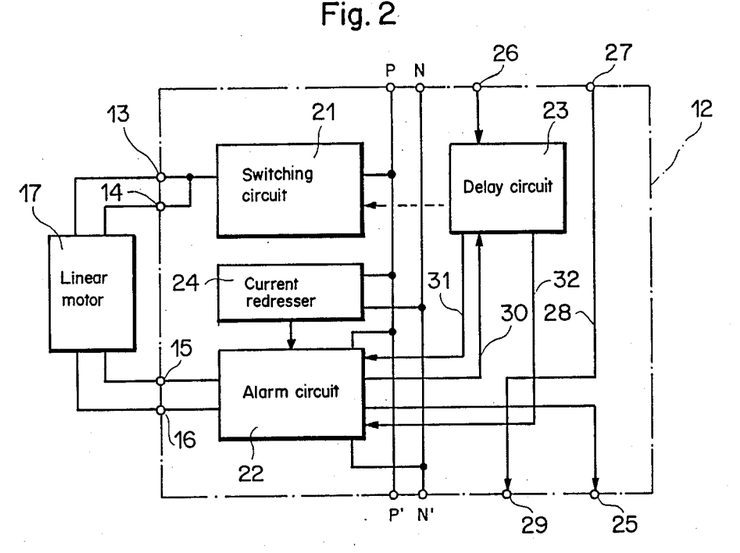
FIG. 2 shows a simple functional diagram of the control equipment based on the present invention.

FIG. 2 depicts a functional diagram of an embodiment of control equipment 12 according to the present invention. A linear motor 17 is connected to four supply terminals 13, 14, 15 and 16 which (as can be seen from FIG. 3) contains a main coil 18, an auxiliary coil 19 and a capacitor 20 connected in line to the auxiliary coil 19. The control equipment comprises a switching circuit 21 for switching the linear motor 17 on and off, an alarm circuit 22 for the supervision of the currents flowing through the main coil 18 and the auxiliary coil 19 of the linear motor 17, a delay circuit 23 for the delayed switching-on of the linear motor 17, and a supply circuit 24 for generating the operation voltage for the alarm circuit 22 and the delay circuit 23.

Furthermore, there are the supply terminals P and N to which the phase and the neutral conductor of an A.C. power supply 220 V are connected. Further supply terminals P' and N' are connected in parallel to the supply terminals P and N so that the alternating voltage 220 V can be connected to the succeeding control equipment.

Figure 1:
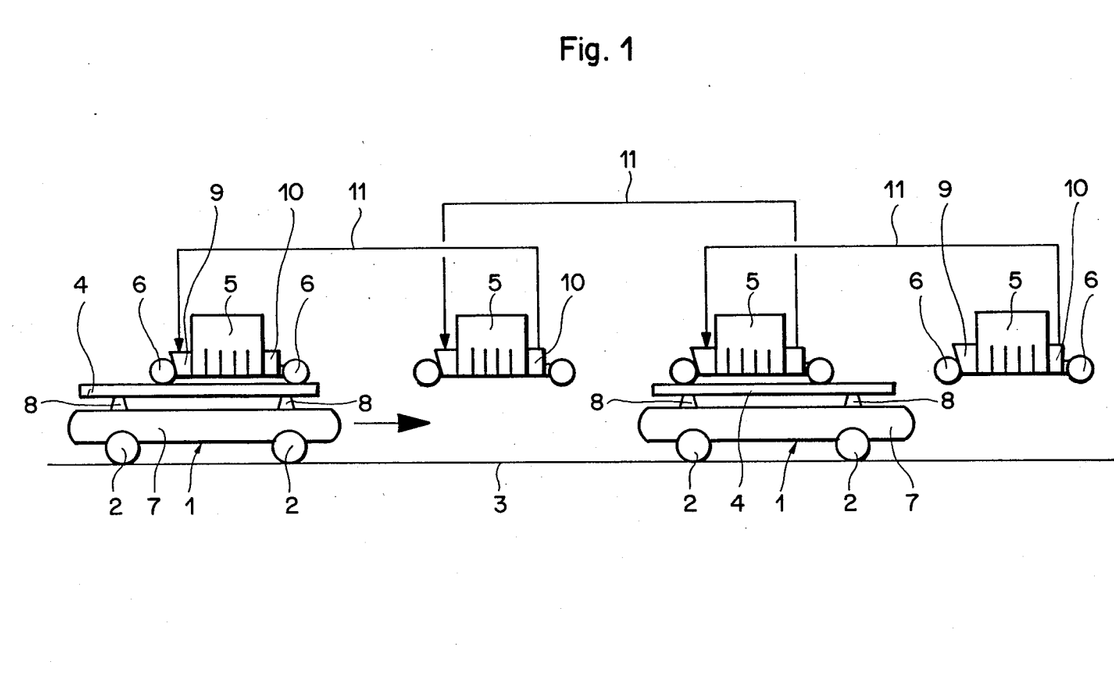
FIG. 1 is a schematic representation of trolleys which are motorized by means of known electro-magnetic linear motors alongside a rail.

An output signal of the alarm circuit 22 appears at a supply terminal 25 if a plate (not shown) and which corresponds to the plate 4 in FIG. 1, is situated in the active area of the linear motor 17. The mentioned output signal is hereafter called the "engaged signal".

Via a supply terminal 26, an engaged signal generated by another control equipment can be transmitted to the delay circuit 23. By means of a conductor 28, a supply terminal 27 is connected with a supply terminal 29 which can be used for transmitting an engaged signal from a succeeding control equipment to a preceding control equipment. An output signal which is complementary to the above-mentioned output signal of the alarm circuit 22 is transmitted as a switch signal via a conductor 30 to the delay circuit 23. Via the transmission lines 31 and 32, blocking signals which are generated and delayed by the delay circuit 23 are transmitted to the alarm circuit 22 when the linear motor 17 is switched on and off.

Figure 3:
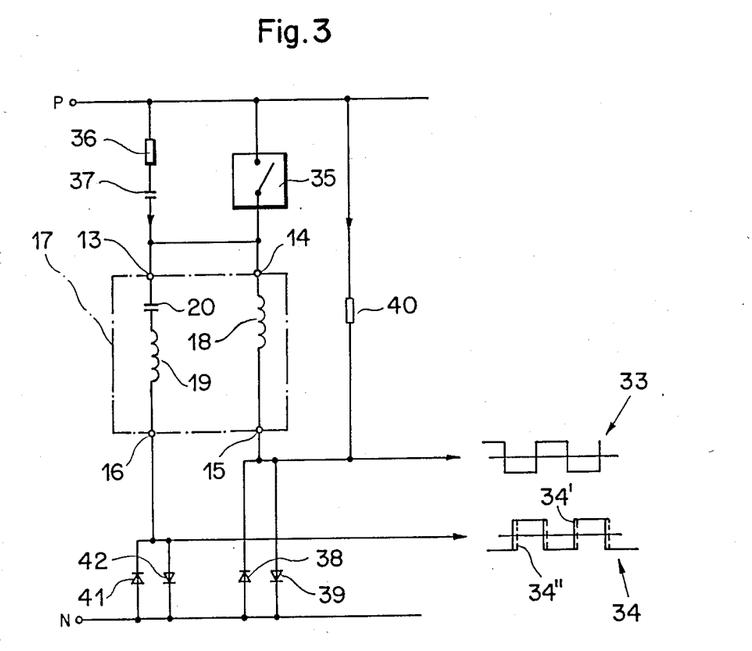
FIG. 3 represents the basic diagram for generating the measuring signals.

FIG. 3 shows the basic diagram for the generation of the measuring signals 33 and 34 which are dependent on the currents flowing through the main coil 18 and the auxiliary coil 19 of the linear motor 17. In FIG. 3, a switching equipment 35 of the switching circuit 22 is represented above the linear motor 17, and a part of the alarm circuit 22 is represented below the linear motor 17. For the protection of the switching equipment 35, a series connection consisting of a resistance 36 and a capacitor 37 is mounted in parallel with switching equipment 35.

If the switching equipment 35 is electrically conductive, a current is flowing on one hand from the supply terminal P via the switching equipment 35 through the main coil 18 and through an antiparallel connection of two diodes 38 and 39 to the supply terminal N. In addition to this current, a compensating current which is defined by a resistance 40 flows through the two antiparallel connected diodes 38 and 39. A voltage appears at the antiparallel connection of diodes 38, 39 which is dependent on the sum of the two above-mentioned currents. This voltage is the rectangular measuring signal 33. On the other hand, a current flows from the supply terminal P via the switching equipment 35 through the series connection consisting of the capacitor 20 and of the auxiliary coil 19 and through another antiparallel connection consisting of two diodes 41 and 42 to the supply terminal N. The voltage appearing above the antiparallel connected diodes 41 and 42 is the rectangular measuring signal 34. The amplitude of the measuring signals 33 and 34 depends on the characteristics of the diodes 38, 39 and 41, 42 and rates for example approximately 0.7 V.

It should be noted that even when switching equipment 35 is non-conductive, a current flows via the series connection consisting of a resistance 36 and of a capacitor 37 through the auxiliary coil 19 as well as through the main coil 18. This means that the measuring signals 33 and 34 are present even if the switching equipment 35 is switched off. The rectangular form of the measuring signals 33 and 34 and their amplitude are always the same. However, the phase shift between these two measuring signals 33 and 34 depends on the respective operating measuring signals 33 and 34 depends on the respective operating status, i.e. if a plate corresponding to plate 4 in FIG. 1 is located in the active area of the linear motor 17 or not, and on the amount of resistance of the resistance 40.

The value of the resistance 40 is selected so as to guarantee that the phase shift difference between the measuring signals 33 and 34 is the same in the switched-on and in the switched-off condition of the switching equipment 35, if the aforementioned plate is in contact with 50% of the active area of the linear motor 17, i.e. if the front or the rear edge of the plate is in the center of the linear motor 17. The measuring signal 34' which is represented in FIG. 3 by a full bar appears if the mentioned plate is not within the active area of the linear motor 17, and the measuring signal 34" represented by a broken bar appears if the plate is in the active area. In other words: the measuring signal 34" derived from the current flowing through the auxiliary coil 19 is phase shifted by the presence of the plate.

Figure 4:
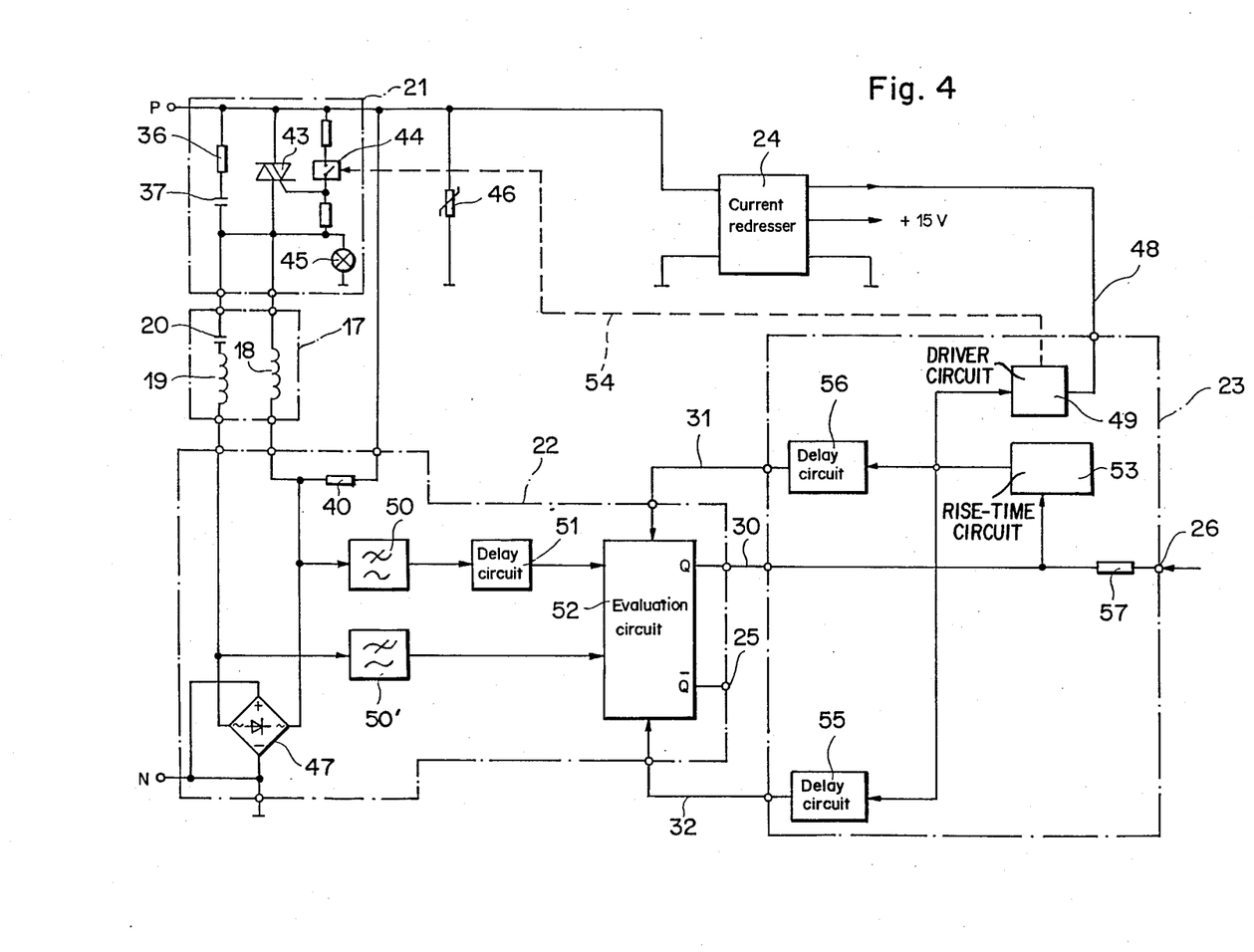
FIG. 4 is a functional chart of the control equipment according to FIG. 2, containing more details.

FIG. 4 shows the wiring diagram of the control equipment according to FIG. 2. The switching circuit 21 is equipped with a triac 43 functioning as a switching equipment to the control electrode of which a control voltage is applied if required via a control medium 44 which may be a dry-reed contact or the receiver of an optocoupler. Moreover, there is a signalling lamp 45 which is illuminated when the triac 43 is conductive and which indicates if the linear motor 17 is switched on.

The supply terminal N for the neutral conductor is connected to the ground of the control equipment 12, and a PTC resistance 46 mounted between the supply terminal P and the ground of the control equipment serves for the protection of the control equipment 12 if the connection between the ground of the control equipment and the neutral conductor is missing.

The antiparallel mounted diodes 38, 39 and 40, 42 described with regard to FIG. 3, are contained in the bridge connected rectifies circuit 47 represented in FIG. 4, the D.C. connections of which are bridged-over and connected to the supply terminal N and the A.C. connections of which are connected respectively to the main coil 18 and to the auxiliary coil 19. The current rectifier supplies a stabilised operating voltage of 15 V for the alarm circuit 22 and the delay circuit 23 as well as a supply voltage of approximately 24 V which is transmitted via a conductor 48 to a driver circuit 49 of the delay circuit 23.

The measuring signal 33 available at the A.C. connection of the bridge connected rectifier circuit 47 which is connected with the main coil 18 of the linear motor 17, is transmitted to an evaluation circuit 52 via a low-pass filter 50 and a delay circuit 51. The measuring signal 34 available at the A.C. connection of the bridge connected rectifier circuit 47 which is connected with the auxiliary coil 19 is also transmitted to the evaluation circuit 52 via a low-pass filter 50'. On the conductor 30 which is connected to the output Q of the evaluation circuit 52, binary signal "1" appears if the afore-mentioned plate is within the active area of the linear motor 17, and a binary signal "0" appears if there is no plate in the active area of the linear motor 17. The binary signals which appear at the supply terminal 25 which is connected to output Q of the evaluation circuit 52, are exactly opposed to those on conductor 30.

The switch signal on conductor 30 is transmitted to an adjustable switch rise-delay time circuit 53 which conveys a signal retarded by 0 to 1.5 s to the driver circuit 49, if the binary signal "1" is transmitted to the delay time circuit 53. Via the transmission path 54 represented by a broken line, the driver circuit either mechanically, magnetically or electrically actuates the control medium 44 which controls the triac 43 which in turn supplies the operating voltage to the main coil 18 and to the auxiliary coil 19 of the linear motor 17 after the rise-delay time circuit has generated the signal for the driver circuit 49. As described in detail hereafter with regard to FIG. 7, the signal appearing at the supply terminal 25 can be transmitted as a busy signal to another control equipment 12.

In dependence upon the output signal of the rise-delay time circuit 53, a blocking signal is returned via a delay circuit 55 to the evaluation circuit 52 in order to block the latter during approx. 0.2 s; this prevents the evaluation circuit from responding to starting transients during the switch-on procedure which is initiated by the control medium 44. A blocking signal is transmitted to the evaluation circuit 52 via a second delay circuit 56 in order to block the latter during approx. 0.2 s after the output signal of the rise-delay time circuit 53 has been switched off; this prevents the evaluation circuit from responding to transient decay currents which occur immediately after the control medium 44 has been switched off. The first delay circuit 55 responds to the leading edge of the signal which is generated by the switch delay time circuit 53, while the second delay circuit responds to the trailing edge of the mentioned signal.

Via the supply terminal 26, an engaged signal from another control equipment 12 can be transmitted to the input of the rise-delay time circuit 53 via a resistance 57 (preferably PTC). The function of this engaged signal is explained hereafter with regard to the description of FIG. 7.

The following paragraphs again describe the functioning method of the control equipment 12 represented in FIG. 4. If none of the mentioned plates are in the active area of the linear motor 17, the binary signal "0" is present on the conductor 30 because the phase relation between the two measuring signals 33 and 34 shows a value which is determined by the value selection of the resistance 40. As long as the signal "0" appears on the conductor 30, the switch delay time circuit 53 cannot transmit a signal to the driver circuit 49 and to the first delay circuit 55. When one of the mentioned plates enters into the active area of the linear motor 17, the phase of the measuring signal 34 is shifted in opposition of the measuring signal 33, which is detected by the evaluation circuit 52. The evaluation circuit then transmits a signal "1" to the conductor 30, and—depending on the adjustment—the switch delay time circuit 53 generates a signal for the driver circuit 49 after 0 to 1.5 s which causes the triac 43 in the switching circuit 21 to become conductive. At the same time, the evaluation circuit 52 is blocked via the delay circuit 55 in order to prevent the evaluation circuit from responding to transient signals.

Should an engaged signal be present at the supply terminal 26 even before the signal "1" appears on conductor 30, the switch delay time circuit 53 cannot respond to the signal "1" on the conductor 30. As soon as the engaged signal disappears at the supply terminal 26, the switch delay time circuit 53 responds immediately if the signal "1" continues to appear on conductor 30. When the plate leaves the active area of the linear motor 17, the phase shift between the two measuring signals 33 and 34 is cancelled which is detected by the evaluation circuit 52. Therefore, the signal "10" appears again on the conductor 30. This causes the switch delay time circuit 53 to stop transmitting signals to the driver circuit 49, and thus the triac 43 becomes non-conductive and the operation voltage for the main coil 18 and for the auxiliary coil 19 of the linear motor 17 is switched off. As soon as the signal at the output of the switch delay time circuit 53 disappears, the second delay circuit 56 generates a blocking signal for the evaluation circuit which is transmitted to the latter via conductor 31. This blocking signal persists approximately 0.2 s and prevents the evaluation circuit 52 from responding to the delay transient signals which occur when the operating voltage of both coils of the linear motor 17 is switched off.

Figure 5:
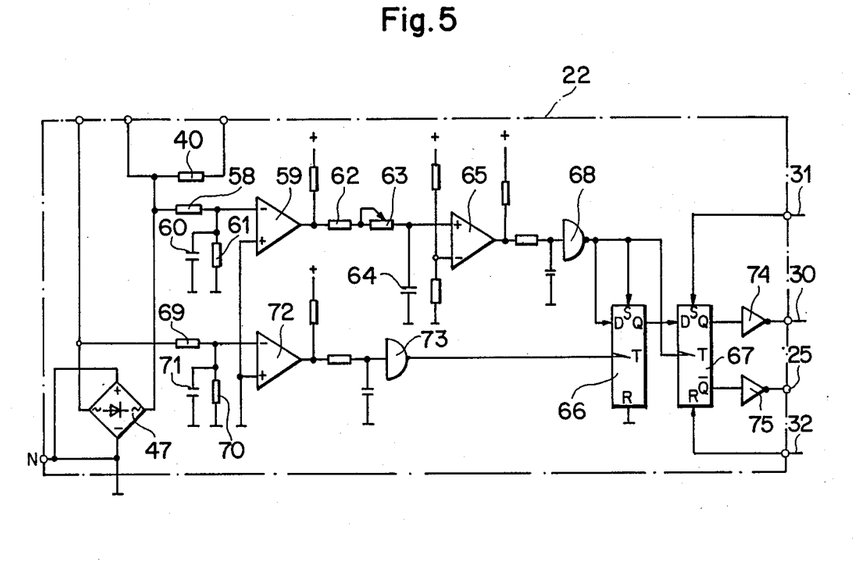
FIG. 5 is the wiring diagram of an alarm circuit of the control equipment according to FIG. 2.

FIG. 5 represents the wiring diagram of an execution example of the alarm circuit 22 of the control equipment according to FIGS. 2 and 4. The measuring signals 33 and 34 are available at the current rectifier bridge connection 47. The measuring signal 33 is transmitted via a resistance 58 to the inverting input of an operational amplifier 59. The resistance 58 and the parallel connection consisting a capacitor 60 and of a resistance 61 form a simple low-pass filter, and the operational amplifier 59 acts as an inverting amplifier. The serial connection consisting of a resistance 62, of an adjustable resistance 63 and of a capacitor 64 as well as of an operational amplifier 65, the non-inverting input of which is connected to the connecting point between the capacitor 64 and the adjustable resistance 63, constitute the delay circuit 51 of FIG. 4.

The evaluation circuit 52 comprises two D-flip-flops 66 and 67. The delayed measuring signal 33 is transmitted via an inverter 68 to the data input D and to the set input S of the D-flip-flop as well as to the cycle input T of the D-flip-flop 67. Output Q of the D-flip-flop 66 is connected with the data input D of the D-flip-flop 67. The second measuring signal 34 measured at the current rectifier bridge connection 47 is transmitted via the simple low-pass filter 52 which is constituted by the resistances 79 and 70 as well as by a capacitor 71, and via an operational amplifier 72 and an inverter 73 to the cycle input D of the D-flip-flop 66. Via the respective inverting drivers 74 and 75 with open collectors, the outputs Q and Q of the D-flip-flop are connected with the conductors 30 and 25 respectively. The set input S of the D-flip-flop 67 is connected to the conductor 31 and the reset input R to the conductor 32.

If a plate is within the active area of the linear motor 17, a rectangular signal appears at the output of the D-flip-flop 66, and the binary signal "1" appears if no plate is within the mentioned active area. Therefore, the signal appearing at the output Q of the D-flip-flop 67 is the binary signal "1" if no plate is within the active area of the linear motor 17, while the signal "0" appears if a plate is within the active area. The signals available at the outputs Q and $\overline{Q}$ of the D-flip-flop are inverted by the respective drivers 74 and 75, so that for example the signal "1" is present on the conductor 30 if the plate is within the mentioned active area, and at the same time the signal "0" appears at the conductor 25.

Figure 6:
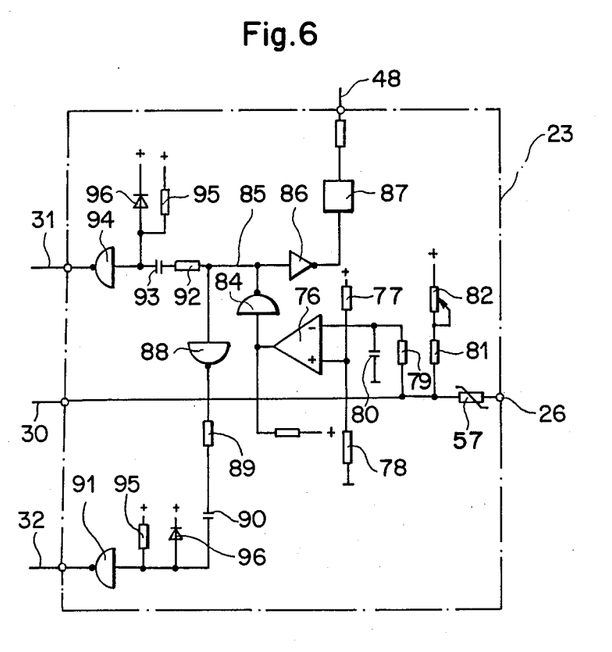
FIG. 6 is the wiring diagram of a delay circuit of the control equipment according to FIG. 2.

FIG. 6 shows the wiring diagram of the delay circuit 23. The switch delay time circuit 53 of the delay circuit comprises an operational amplifier 76, to the non-inverting input of which a reference voltage generated by a voltage divider containing the resistances 77 and 78 is fed. The conductor 30 is connected to a time constant circuit consisting of a resistance 79 and of a capacitor 80, and the connecting point between the resistance 79 and the capacitor 80 is connected to the inverting input of the operational amplifier 76. The conductor 30 is further connected via a serial connection consisting of a resistance 81 and of an adjustable resistance 82 to the positive terminal of the supply circuit 24 and via the PTC resistance 57 to the supply terminal 26.

As long as no plate is within the active area of the linear motor 17, the signal on the conductor 30 is "0", i.e. the output transistor of the driver 74 is conductive. Therefore, the voltage at the connecting point between the resistances 79 and 81 is practically zero and the capacitor 80 is discharged. Accordingly, the output signal of the operational amplifier 76 is equal to "0". Via an inverter 84, this signal is inverted and transmitted to a conductor 85. This inverted signal arrives at an inverting driver 86, the output of which is connected to an excitation medium 87, for example, an exciting coil of a dry-reed contact or a transmitter of an opto-coupler. The driver 86 and the excitation medium 87 together constitute the high level 49 of FIG. 4. The operation voltage of the excitation medium 87 is supplied via the conductor 48 by the supply circuit 24.

On one hand, the conductor 85 is connected to an input of inverter 88, the output of which is connected to the input of an inverter 91 via the serial connection consisting of a resistance 89 and of a capacitor 90, and on the other hand the conductor 85 is connected to an inverter 94 via another serial connection consisting of a resistance 92 and of a capacitor 93. The connecting points between the capacitor 90 and the inverter 91 and between the capacitor 93 and the inverter 94 are each connected to the positive terminal of the supply circuit 24 via a respective parallel connection consisting of a resistance 95 and of a diode 96.

The inverters 88 and 91, the resistance 89 and the capacitor 90 as well as the associated parallel connection consisting of the resistance 95 and of the diode 96 constitute the first delay circuit 55 of the delay wiring system 23 of FIG. 4. The inverter 94, the capacitor 93 and the resistance 92 as well as the associated parallel connection of the resistance 95 and of the diode 96 together constitute the second delay circuit 56.

The inverter 91 generates a blocking signal which lasts approximately 0.2 s, if the signal at the output of the operational amplifier 76 increases, this blocking signal being transmitted via the conductor 32 to the reset input R of the D-flip-flop 67 of the alarm circuit 22. The inverter 94 generates a blocking signal of approximately 0.2 s, if the signal at the output of the operational amplifier decreases, this signal being transmitted via the conductor 31 to the set input of the D-flip-flop 67.

As soon as the plate enters into the active area of the linear motor 17, the signal on the conductor 30 changes from "0" to "1", i.e. the output transistor of the driver 74 becomes non-conductive. The result of this is that the capacitor 80 is charged via the resistances 79, 81 and the adjustable resistance 82 if there is no busy signal at the supply terminal 26. After a period, adjustable by means of the adjustable resistance 82 between 0 and 1.5 s, the voltage at the capacitor 80 reaches the value of the above-mentioned reference voltage, and the output voltage at the output of the operational amplifier 76 quickly increases. The result of this is that the signal "1" on conductor 85 changes to "0" and the excitation medium 87 is excited, which in turn causes the triac 43 in the switching circuit 21 to become conductive and the main coil 18 and the auxiliary coil 19 to be energized by the operating voltage and the plate is thus moved forward by the linear motor 17.

The signal change from "1" to "0" on the conductor 85 causes the inverter 91 to supply the above-mentioned blocking signal, the duration of which depends on the value of resistance 89 and of the capacitor 90, whereas the inverter 94 does not react to this signal change.

After the plate has been moved away from the active area of the linear motor 17, the signal on conductor 30 changes back to "0". The result of this is that the capacitor 80 is quickly discharged via the resistance 79. This causes the voltage at the inverting input of the operational amplifier 76 to sink below the mentioned reference voltage, which in turn causes the output voltage of the operational amplifier 76 to revert to its initial value. This results in a signal change from "0" to "1" which occurs on conductor 85. Thereupon, the inverter 94 transmits a blocking signal via conductor 31 to the set input S of the D-flip-flop 67 during a period which is determined by the capacitor 93 and by the resistance 92.

This blocking signal maintains the D-flip-flop in the set status until the transient decay effects which have been caused by the switching-off of the operation voltage for the main coil 18 and the auxiliary coil 19 of the linear motor by the triac 43 have been damped. The inverter 91 does not react to the signal change from "0" to "1" on the conductor 85; however, the excitation medium 87 is de-energized, which results in the already mentioned switching-off of the operation voltage by the triac 43.

If, for the reason described hereafter with regard to FIG. 7, an engaged signal in the form of a binary signal "0" is present at the supply terminal 26, the capacitor 80 of the delay wiring system 23 will not be charged, not even if the driver 74 is actuated by the output signal at the output Q of the D-flip-flop 67.

FIG. 7 is a rough schematic representation of a part of an installation with four consecutively arranged linear motors 17, 17a, 17b and 17c, including the associated control equipments 12, 12a, 12b and 12c. Of course the linear motors 17 through 17c are each equipped with a main coil and an auxiliary coil, even though FIG. 7 shows only one coil. Furthermore, only the plates 4' and 4" are represented. In order to simplify the drawing, the associated trolleys have been left out. The general sense of movement of the plates 4' and 4" has been indicated by an arrow 97.

According to the situation represented in FIG. 7, the plate 4" is within the active area of the linear motor 17b. This fact has been detected by the control equipment 12b, and the associated switching equipment 35 is closed, i.e. conductive, which means that the linear motor 17b is active and drives the plate 4" in the direction of the arrow 97 because no engaged signal is present at the supply terminal 26 of the control equipment 12b. The alarm circuit 22 of the control equipment 12b generates an engaged signal which is transmitted via the output terminal 25, a link circuit 98, the conductor 28 of the control equipment 12 a and a further link circuit 99 to the supply terminal 26 of the control equipment 12. This engaged signal blocks the delay circuit 23 of the control equipment 12 which prevents the associated linear motor 17 from being switched on even though the plate 4' is within the active area of this linear motor 17. This fact has of course been detected by the alarm circuit 22 of the control equipment 12 which therefore transmits an engaged signal to the output terminal 25 of the control equipment 12. This engaged signal is transmitted in the same way as mentioned above with regard to the engaged signal of the control equipment 12b to a preceeding control equipment which is not represented in FIG. 7.

The plate 4' moving below past the linear motor 17 is accordingly not accelerated, unless the plate 4" leaves the active area of the linear motor 17b before the plate 4' has moved out of the active area of the linear motor 17. This is when the busy signal generated by the control equipment 12b is switched off, and after the switch delay time adjusted in the delay circuit 23 of the control equipment 12 has expired, the linear motor 17 is switched on, provided that the plate 4' is still within its active area.

As soon as the plate 4" enters into the active area of the linear motor 17c, this fact is detected by the alarm circuit 22 of the control equipment 12c which generates an engaged signal that is transmitted via the supply terminal 25 of the control equipment 12c, a link circuit 100, the conductor 28 of the control equipment 12b, a link circuit 101 and the supply terminal 26 to the delay circuit 23 of the control equipment 12a. This prevents the linear motor 17a from being activated, which in turn prevents an acceleration of the plate 4' that has entered into the active area of this linear motor for as long as the plate 4" is within the active area of the linear motor 17c.

The wiring method described above can be used for the entire track of an installation; however, it is particularly advantageous to use it on so-called accumulation track sections in front of point mechanisms or chain drive units. This wiring method prevents trolleys from colliding harshly with each other. Furthermore, only those linear motors are switched on which are absolutely required. This allows for a considerable energy savings. During the stacking procedure, the trolleys smoothly approach each other and are subsequently separated when they move on, which is also the case on the normal track sections.

The engaged signal can also be transmitted to the control equipment which follows immediately. The switch delay time, caused by the delay circuit 23, is adjustable and influences the average speed of the trolleys. A long switch delay time results in a slow average speed, while a short switch delay time results in a high average speed.

I claim:

1. A control apparatus for a linear motor having a main driving coil and an auxiliary driving coil, and a switching circuit connected in series with said coils to control a current flow through said coils from a voltage source in response to a switch signal, the supply of current to said coils by said switching circuit causing movement of a movable plate, said apparatus comprising:
   means for generating a first measuring signal in response to a current flow through said main coil;
   means for generating a second measuring signal in response to a current flow through said auxiliary coil;
   sensing means responsive to said first and second measuring signals for sensing if said movable plate is within an active area of said linear motor and for generating a switch signal to said switching circuit when said plate is within said active area; and
   delay means for delaying the transmission of said switch signal to said switching circuit, wherein said means for generating a first measuring signal comprises a first pair of antiparallel connected diodes connected in series with said main coil, and said means for generating a second measuring signal comprises a second pair of antiparallel connected diodes connected in series with said auxiliary coil.

2. A control apparatus for a linear motor having a main driving coil and an auxiliary driving coil, and a switching circuit connected in series with said coils to control a current flow through said coils from a voltage source in response to a switch signal, the supply of current to said coils by said switching circuit causing movement of a movable plate, said apparatus comprising:
   means for generating a first measuring signal in response to a current flow through said main coil;
   means for generating a second measuring signal in response to a current flow through said auxiliary coil;
   sensing means responsive to said first and second measuring signals for sensing if said movable plate is within an active area of said linear motor and for generating a switch signal to said switching circuit when said plate is within said active area;
   delay means for delaying the transmission of said switch signal to said switching circuit; and
   means for maintaining a predetermined current flow through said main and auxiliary coils even when said switching circuit does not provide a current flow through said coils.

3. A control apparatus as in claim 2 wherein said maintaining means comprises a serial connection of a capacitor and a resistor, which serial connection is connected in parallel with said switching circuit.

4. A control apparatus for a linear motor having a main driving coil and an auxiliary driving coil, and a switching circuit connected in series with said coils to control a current flow through said coils from a voltage source in response to a switch signal, the supply of current to said coils by said switching circuit causing movement of a movable plate, said apparatus comprising:
   means for generating a first measuring signal in response to a current flow through said main coil;
   means for generating a second measuring signal in response to a current flow through said auxiliary coil;
   sensing means responsive to said first and second measuring signals for sensing if said movable plate is within an active area of said linear motor and for generating a switch signal to said switching circuit when said plate is within said active area;
   delay means for delaying the transmission of said switch signal to said switching circuit, and
   a resistance connected in parallel across a serial connection of said switching circuit and said main coil.

5. A control apparatus for a linear motor having a main driving coil and an auxiliary driving coil, and a switching circuit connected in series with said coils to control a current flow through said coils from a voltage source in response to a switch signal, the supply of current to said coils by said switching circuit causing movement of a movable plate, said apparatus comprising:
   means for generating a first measuring signal in response to a current flow through said main coil;
   means for generating a second measuring signal in response to a current flow through said auxiliary coil;
   sensing means responsive to said first and second measuring signals for sensing if said movable plate is within an active area of said linear motor and for generating a switch signal to said switching circuit when said plate is within said active area;
   delay means for delaying the transmission of said switch signal to said switching circuit,
   said sensing means further (i) generating an engaged signal for controlling another control apparatus when said plate is within said active area and (ii) comprising a first and second flip-flop, the output of said first flip-flop being connected to a data input of said second flip-flop, said first measuring signal being coupled to a data input and a set input of said first flip-flop and to a cycle input of said second flip-flop, said second measuring signal being coupled to a cycle input of said first flip-flop; a pair of inverting driver circuits respectively connected to a pair of complementary outputs of said second flip-flop, said switch signal appearing at the output of one of said inverting driver circuits and said engaged signal appearing at the output of the other inverting driver circuit when said plate is in the active area of said linear motor.

* * * * *